(12) United States Patent
Yamamoto (10) Patent No.: US 7,215,625 B2
(45) Date of Patent: May 8, 2007

(54) OPTICAL DISK RECORDING APPARATUS THAT RECORDS A VISIBLE IMAGE ON AN OPTICAL DISK

(75) Inventor: Kazutaka Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 490 days.

(21) Appl. No.: 10/329,394

(22) Filed: Dec. 27, 2002

(65) Prior Publication Data

US 2004/0125730 A1 Jul. 1, 2004

(51) Int. Cl.
G11B 5/09 (2006.01)
G11B 7/00 (2006.01)

(52) U.S. Cl. .................................................. 369/59.24
(58) Field of Classification Search .............. 369/52.1, 369/53.2, 53.3, 59.25
See application file for complete search history.

(56) References Cited

U.S. PATENT DOCUMENTS

| | | | | |
|---|---|---|---|---|
| 4,835,754 | A | | 5/1989 | Yamamoto et al. |
| 5,694,381 | A | * | 12/1997 | Sako ........................ 369/47.12 |
| 5,781,221 | A | * | 7/1998 | Wen et al. .................. 347/232 |
| 5,915,858 | A | * | 6/1999 | Wen ............................. 400/61 |
| 6,019,151 | A | * | 2/2000 | Wen et al. .................. 156/387 |
| 6,034,930 | A | * | 3/2000 | Kitahara .................. 369/47.15 |
| 6,163,515 | A | | 12/2000 | Yamamoto |
| 6,198,707 | B1 | | 3/2001 | Yamamoto |
| 6,309,727 | B1 | * | 10/2001 | Mueller et al. ............. 428/64.1 |
| 6,418,099 | B2 | | 7/2002 | Yamamoto |
| 6,771,297 | B2 | * | 8/2004 | Bronson ..................... 347/224 |
| 6,785,221 | B2 | * | 8/2004 | Wilkinson et al. ........ 369/275.4 |
| 2002/0060961 | A1 | | 5/2002 | Yamamoto |
| 2002/0126612 | A1 | | 9/2002 | Yamamoto |
| 2002/0191517 | A1 | * | 12/2002 | Honda et al. ............. 369/53.29 |
| 2003/0002414 | A1 | | 1/2003 | Yamamoto |
| 2003/0021201 | A1 | * | 1/2003 | Kobayashi ............... 369/47.39 |
| 2003/0048720 | A1 | | 3/2003 | Yamamoto |
| 2003/0107959 | A1 | * | 6/2003 | Norton et al. ............ 369/30.23 |

FOREIGN PATENT DOCUMENTS

| | | |
|---|---|---|
| EP | 1049079 A1 * | 11/2000 |
| JP | 5-6576 | 1/1993 |
| JP | 11-134648 | 5/1999 |
| JP | 11-213455 | 8/1999 |

* cited by examiner

Primary Examiner—William Korzuch
Assistant Examiner—Adam R. Giesy
(74) Attorney, Agent, or Firm—Dickstein Shapiro LLP (57) ABSTRACT

An optical disk recording apparatus is provided that includes an optical pickup, an image encoder that generates data corresponding to a visual image to be drawn in a recording region of an optical disk, an LD control unit that controls the optical pickup and records long pits and long spaces that form the visual image in the recording region, and a system controller that determines whether no reproducible data are stored in the recording region and records the visual image by controlling the LD control unit. Since the reflective ratio of the region where the long pits are formed changes, the region becomes visible to a user. Accordingly, any characters and figures designated by an external device can be visibly recorded on the data recording surface of the optical disk.

13 Claims, 5 Drawing Sheets

PIXEL 1

PIXEL 2

PIXEL 3

PIXEL 4

OPTICAL DISK RECORDING APPARATUS THAT RECORDS A VISIBLE IMAGE ON AN OPTICAL DISK

BACKGROUND OF THE INVENTION

1. Field of the Invention

The present invention generally relates to an optical disk recording apparatus, and more particularly, to an optical disk recording apparatus that can draw visible characters- and figures on the recording region of an optical disk such as a CD-R disk, a CD-RW disk, and a DVD disk.

2. Description of the Related Art

Optical disks, especially CD-R disks, are rapidly being popularized as recording media to exchange data between personal computers, since the prices of both recording media and recording apparatuses are becoming lower. Additionally, CD-R disks are handy because they can store data that are too large to store on a flexible disk, and can be read by CD-ROM drives that are installed in most personal computers as a standard feature. Furthermore, thanks to recent improvement in recording speed of CD-R drives, a user can store a large amount of data in a CD-R disk in a short period of time.

In a case where a user has hundreds of CD-R disks, the user faces difficulty in identifying and arranging the CD-R disks.

In the case of a so-called stamped CD, a ready-made factory-recorded medium, identification information and contents thereof are printed on the label side of the stamped CD. The user can identify a stamped CD and know its contents based on the printed information.

For example, Japanese Laid-open Patent Application No. 5-6576 discloses an optical disk on which a visible mark is indicated by forming a pit and a method of fabricating the optical disk.

Furthermore, Japanese Laid-open Patent Application No. 11-213455 discloses an optical disk on which a visible mark is indicated by extending the length of a pit.

On the other hand, in the case of CD-R, nothing or only the brand mark of the manufacturer of the CD-R disk is printed. The user cannot identify the CD-R disk or recognize the contents stored in the CD-R disk by looking at the exterior of the CD-R disk.

After storing data therein, the user usually hand-writes identification information such as a title on the label side of the CD-R disk using an oily pen to avoid this problem. In this case, the user needs the oily pen, and the hand-written title does not look nice.

The user may print the identification information on a label dedicated to the CD-R disk and stick the label on the CD-R disk, or print directly on the CD-R disk, if the CD-R disk can retain the printing. The user can print a full-colored beautiful label in this case. The label, however, incurs an additional cost, and the data stored therein may be damaged if the data recording layer of the CD-R disk becomes unstuck together with the label. If the user desires to directly print the identification information on the CD-R disk, the user needs a dedicated printer and a CD-R disk that can retain the printing, which disk costs more than a regular CD-R disk.

Based on the background as described above, a method of indicating the title and the contents of the CD-R disk without using a pen or a dedicated printer is desired.

Data are recorded in a CD-R disk by deforming the recording layer (burning the dye) and substrate (forming "pits") by a strong laser beam. The data recorded in the CD-R disk are read by applying a weak laser beam to the pits and detecting the change in the light reflected by the pits.

The change in the reflective light heavily depends on the frequency of the laser beam. Because the reflective ratio of visible light is changed by the pits, the color of a portion where data are recorded differs from the color of the other portion.

In the case of a stamped CD, an image formed on the recording side by stamping pits is not visible since the change in reflective ratio is not large enough and contrast is too low. In the case of a CD-R disk, the image formed on the recording side has a contrast large enough for visual recognition.

It is possible to write visual characters and figures on the recording region of the CD-R disk by forming pits using tracks in the recording region.

Conventionally, Japanese Laid-open Patent Application No. 11-134648, for example, has proposed an optical disk recording apparatus that avoids reducing data capacity of the CD-R disk by superimposing the visual image on recorded data. Japanese Laid-open Patent Application No. 11-134648, for example, has further proposed an optical disk recording apparatus that forms a visual image by converting data expressed in rectangular coordinates into data expressed in polar coordinates and changing the pit width in accordance with the data expressed in polar coordinates.

Such conventional optical disk recording apparatuses, however, cannot protect the accuracy of recorded data and cannot provide the contrast required for visual recognition even if the pit width is changed in accordance with the data converted from rectangular coordinates to polar coordinates.

SUMMARY OF THE INVENTION

Accordingly, it is a general object of the present invention to provide a novel and useful optical disk recording apparatus in which one or more of the problems described above are eliminated.

Another and more specific object of the present invention is to provide an optical disk recording apparatus that can record a clear visual image in a recording region in which data are recorded without degrading the accuracy of the recorded data.

To achieve one of the above objects, an optical disk recording apparatus, according to the present invention, includes the following: an optical pickup that forms short pits and short spaces corresponding to reproducible data in a recording region of an optical disk by applying a laser beam thereto; an image encoder that generates image encode data corresponding to long pits and long spaces based on image data of a visual image received from an external device; an LD control unit that causes said optical pickup to apply said laser beam based on said image encode data; and a system controller that records said visual image by controlling said LD control unit to record said visual image in the recording region where no reproducible data are recorded.

The optical disk recording apparatus forms long pits and long spaces in the recording region where no reproducible data are recorded. Since the reflective ratio of the region where the long pits are formed changes, the region becomes visible to a user. Accordingly, any characters and figures designated by the external device can be recorded on the data recording surface of the optical disk.

Other objects, features, and advantages of the present invention will become more apparent from the following detailed description when read in conjunction with the accompanying drawings.

DETAILED DESCRIPTION OF THE PREFERRED EMBODIMENTS

Preferred embodiments of the present invention will be described by reference to the drawing.

Figure 1:
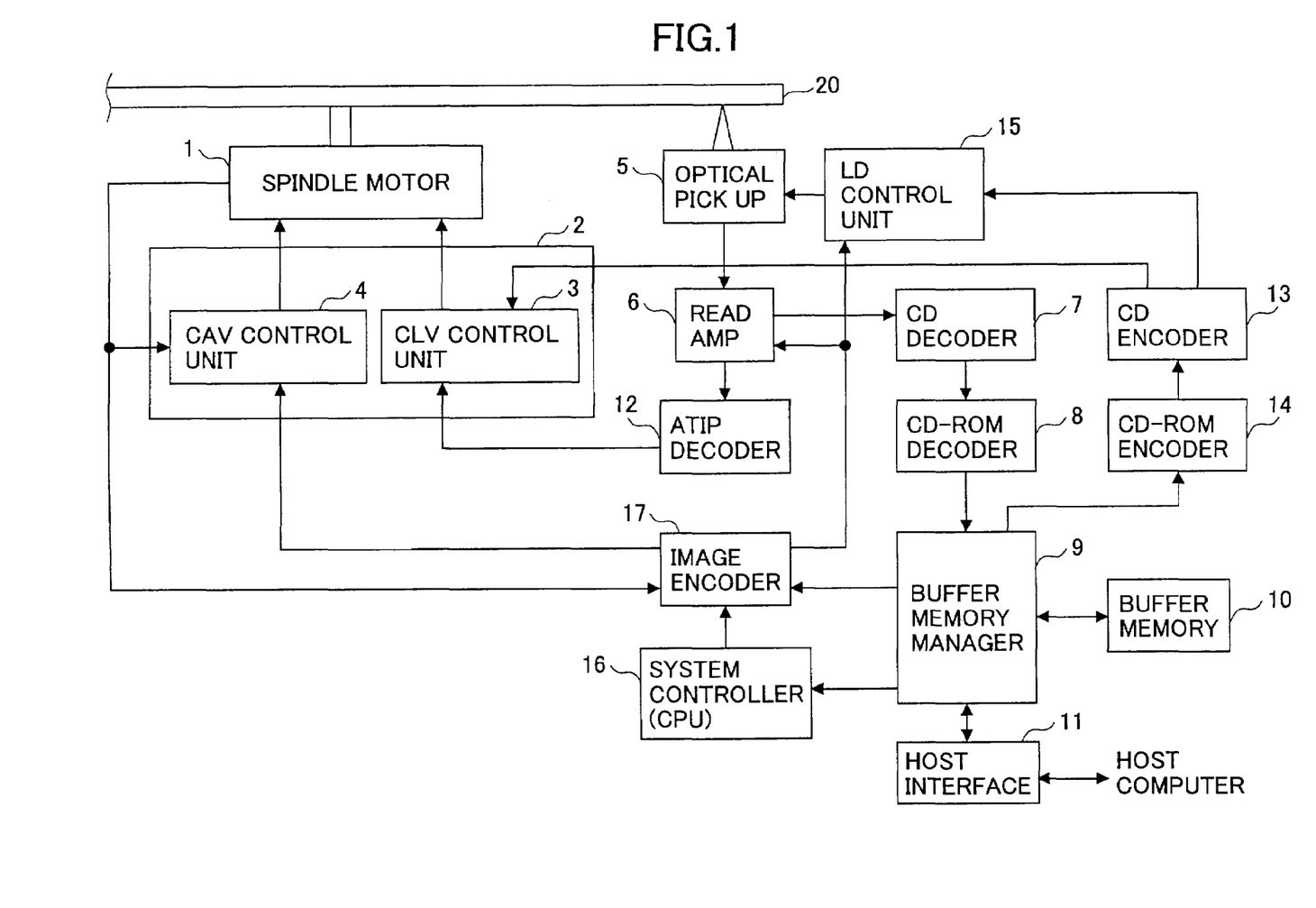
FIG. 1 is a block diagram showing an optical disk recording apparatus according to an embodiment of the present invention.

FIG. 1 is a block diagram showing the construction of an optical disk recording apparatus according to an embodiment of the present invention. Arrows showed in the diagram indicate the flows of some, but not all, major signals and data.

An example of this optical disk recording apparatus is a CD-R drive and so forth that are realized by a micro computer including CPU, ROM, and RAM.

An optical disk 20 is a recordable medium such as a CD-R disk. The optical disk 20 is rotated at a predetermined rotative speed by a spindle motor 1.

The spindle motor 1 is controlled by a motor driver servo unit 2 so that the spindle motor 1 rotates at either a constant linear velocity or a constant angular velocity. Both the linear velocity and the angular velocity can be changed in some steps.

An optical pickup 5 is constructed by the following elements (not showed): a semiconductor laser, an optical system, a focus actuator, a track actuator, a photo detector, a position sensor, and so forth. The optical pickup 5 applies a laser beam to the optical disk 20. The optical pickup 5 writes data by forming pits and spaces on the optical disk 20, and reads the data recorded in the optical disk 20.

The optical pickup 5 can move to the data recording surface of the optical disk 20 by a publicly known seek motor (not showed). The focus actuator, the track actuator, and the seek motor are controlled based on signals from the photo detector and the position sensor so that the laser spot of the laser beam is positioned at a desired position (recording position or reproducing position) relative to the data recording surface by the motor driver servo unit 2.

In the case of reading data, a reproduced signal obtained by the optical pickup 5 is amplified by a read amp 6 and converted into binary data. The binary data are processed by a CD decoder 7 for de-interleaving and error correction. The data are further processed by a CD-ROM decoder 8 for error correction. Then, the data are buffered by a buffer memory manager 9 in a buffer memory 10 (buffer RAM). When all sector data are ready, the sector data are transmitted in a block to a host computer via a host interface (I/F) 11.

In the case of writing data, data transmitted from the host computer through the host interface 11 are buffered by the buffer memory manager 9 to the buffer memory 10. The optical disk recording apparatus begins writing the buffered data on the optical disk 20 when a certain amount of data is buffered in the buffer memory 10. Before data are written in the optical disk 20, the optical disk recording apparatus needs to position the laser spot at a position on the optical disk 20 at which the data are to be written. The position is determined based on the wobble signal provided to the optical disk 20 by wobbling the tracks. The wobble signal includes information indicating absolute time, called ATIP. The information indicating the absolute time is separated from the reproduced signal by an ATIP decoder 12.

The sync signal generated by the ATIP decoder 12 is input to the CD encoder 13 (flow not showed) so that the optical disk recording apparatus begins writing the data at an accurate position. Error correction codes are added to the data buffered in the buffer memory 10 and the data are interleaved by the CD-ROM encoder 14 and the CD encoder 13. The CD encoder 13 converts the data into a recording EFM signal. The laser beam controlled by an LD control unit 15 and the optical pickup 5 forms pits on the optical disk 20.

The LD control unit 15 controls the power of the laser beam so that the semiconductor laser emits the laser beam of a write power level in accordance with the recording EFM signal and the data are written and read in appropriate conditions.

The operation of writing a visual image according to an embodiment of the present invention will be described below.

Image data transmitted by the host computer via the host interface 11 are temporarily stored in the buffer memory 10 by the buffer memory manager 9. When all the image data are received, or when a predetermined amount of image data has been received, the optical disk recording apparatus begins writing the visual image on the optical disk 20. If all the image data have not been received, the optical disk recording apparatus may continue to receive image data from the host computer while the visual image is written on the optical disk 20.

A system controller (CPU) 16 activates the spindle motor 1 and an image encoder 17, and moves the optical pickup 5 to a position (the position at which the writing of the visual image starts) designated by the host computer. The CLV control unit 3 of the motor driver servo unit 2 rotates the spindle motor 1 at a constant linear velocity based on the sync signal output by the ATIP decoder 12.

The image encoder 17 generates image encode data consisting of pits and spaces longer than those indicating reproducible data based on the image data. The LD control unit 15 applies a laser beam of a predetermined write power level to the optical disk 20 in response to the pit signal of the image encode data.

As described above, the system controller 16 forms long pits and spaces in the unrecorded region of the data recording surface of the optical disk 20 by applying the laser beam.

The difference in reflective ratio between the long pits and the long spaces makes the image data visible.

Since pits physically formed on the data recording surface of the optical disk 20 change the reflective ratio of the region where the pits are formed, clearly visible characters and marks can be indicated by forming pits in an appropriate region.

That is, the image encoder 17 generates the image encode data consisting of longer pits and spaces than the recorded reproducible data based on the image data. The LD control unit 15 controls the optical pickup to apply a laser beam based on the image encode data generated by the image encoder 17. The system controller 16 forms the long pits and spaces in a region where no data have been recorded by controlling the LD control unit 15 to apply a laser beam, and records a visual image that the difference in reflective ratio between the long pits and the long spaces makes visual.

In the case where a track is regarded as a horizontal scanning line of rectangular coordinates, physical positional relationship of adjacent tracks is important.

The ATIP of the CD-R disk is recorded based on CLV. If ATIP is used as a reference signal, a complicated calculation is necessary for coordinates conversion and adjustment. The host computer may take care of this calculation to reduce the work load of the optical disk recording apparatus. However, fine adjustment more than the recording resolution is impossible, and as a result, the image data may be increased in size and/or the image quality may be degraded.

Accordingly, to solve these problems easily, the visible image can be recorded by CAV control.

The system controller (CPU) 16 activates the spindle motor 1 and the image encoder 17, and moves the optical pickup 5 to a position (the position at which the writing of the visual image starts) designated by the host computer. The CAV control unit 4 of the motor driver servo unit 2 rotates the spindle motor 1 at a constant angular velocity based on the reference signal output by the image encoder 17.

The CAV control unit 4 compares the reference signal output from the image encoder 17 and an FG signal output from the spindle motor 1, and controls the rotation of the spindle motor 1 in synchronization to the image data. That is, when recording the visual image, the CAV control unit 4 and the image encoder 17 rotate the optical disk 20 at a constant angular velocity so that a track making a circuit of the optical disk 20 corresponds to a horizontal scanning line of rectangular coordinates.

The image encoder 17 generates image encode data consisting of longer pits and spaces than reproducible data based on the image data. The image encode data are transferred to the LD control unit 15 and the read amp 6 in synchronization to the FG signal of the spindle motor 1 so that the optical disk recording apparatus always begins writing data for each track of the image at the same rotative angle. Since the accuracy of this synchronization affects the image quality very much, the number of the FG pulse may be increased, or a dedicated index pulse circuit may be additionally provided. The entire track making a circuit of the optical disk 20 does not need to correspond to a horizontal scanning line of rectangular coordinates unless image data exceeding about half the track are specified. The LD control unit 15 applies a laser beam of predetermined power for writing to the optical disk 20 in response to the pit signals of the image encode data.

As described above, the system controller 16 forms longer pits and spaces in an unrecorded region of the data recording surface of the optical disk 20 by controlling the applying of the laser beam. The difference in reflective ratio between the longer pits and the longer spaces makes the recorded image visible. The pits formed in a portion of the data recording surface of the optical disk 20 change the reflective ratio of the portion. Using this effect, the user can write a clear visible image on the data recording surface of the optical disk 20.

The user can record visible title and contents of the optical disk without using a pen or a dedicated printer and without degrading the quality of recorded reproducible data.

The tracking servo controls the laser beam so that it does not protrude from a groove of an optical disk comprising a track; the focus servo controls the laser beam so that it converges to a spot on the recording layer.

An error signal required for the servo control is generated from the reflective light of the laser beam. When the amount of laser beam power changes, the amplitude of the error signal changes and that affects the accuracy of the servo control.

To avoid this problem, the amplifying ratio of the error signal is switched when the amount of the laser beam power substantially changes between a writing operation and a reading operation.

In the writing operation, the amount of laser beam power substantially changes too, but the change matters little since its cycle is short enough compared to the servo band.

In the case of the recording of a visual image, making a pit may last for a long time. If the amount of laser beam power is not switched during this period, the servo control may fail.

Accordingly, the pit data may be transferred to the read amp 6 so that the system controller 16 can adjust the amplifying ratio of the error signal required for the servo control of the actuator in response to the increase in the amount of reflective light created by the write power.

That is, the system controller 16 adjusts the amplifying ratio of the error signal to servo control the optical pickup 5 in response to the change in the amount of laser beam power while the visual image is recorded so that the optical pickup 5 is servo-controlled steadily even when the long pits and spaces are formed.

The pits forming the visual image are accurately recorded in the manner as described above.

Figure 2:
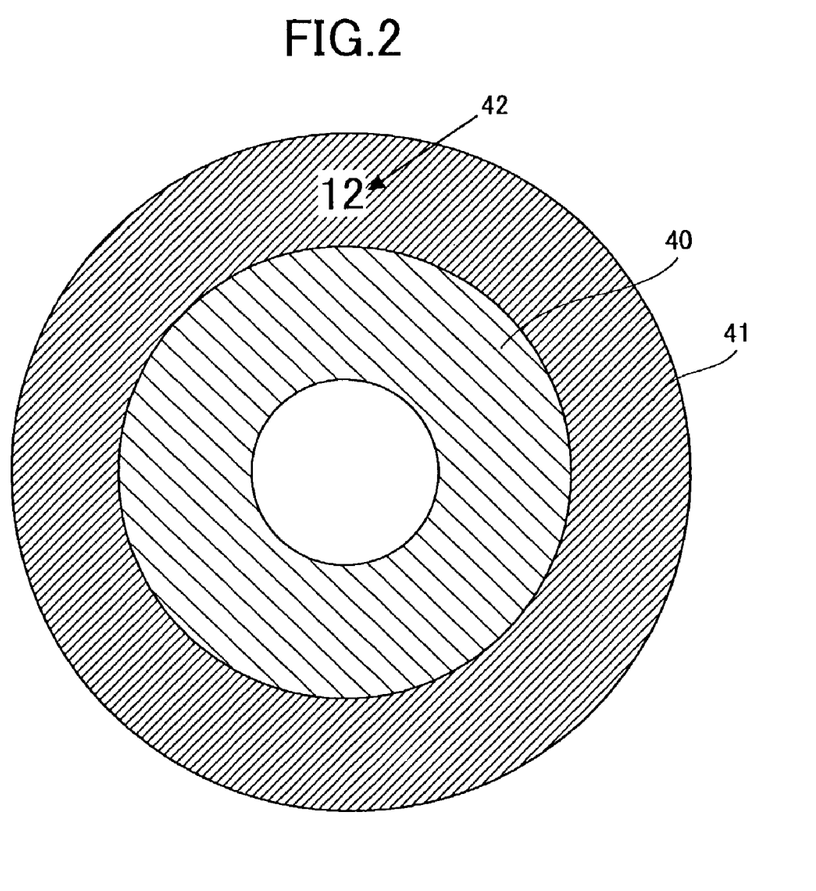
FIG. 2 is a schematic diagram showing a visual image formed on an optical disk as an embodiment of the present invention.

FIG. 2 is a schematic diagram showing a visual image formed on the recording surface of an optical disk.

Figure 3:
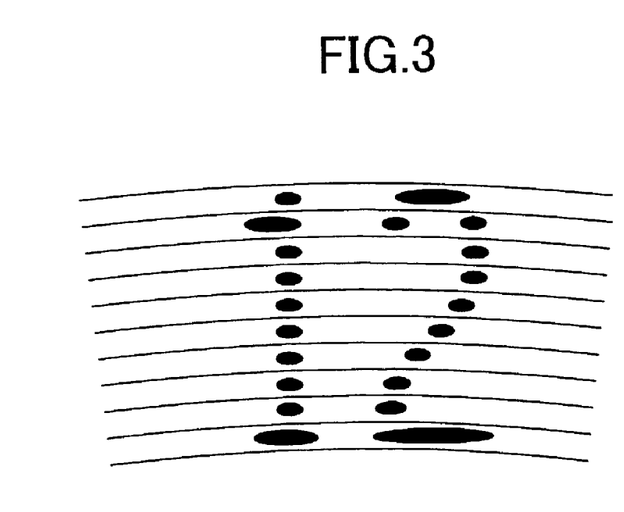
FIG. 3 is a schematic diagram showing the enlarged image of the visual image of FIG. 2.

FIG. 3 is a schematic diagram showing the visual image of FIG. 2 by enlarging.

As showed in FIG. 2, in the case of a CD-R disk, data are recorded from the inner radius. The reference numeral "40" indicates a recorded region of the inner radius in which reproducible data are recorded; the reference numeral "41" indicates an unrecorded region of the outer radius in which no data are recorded. A visual image 42 is showed as being recorded in the unrecorded region 41.

In this case, if the recording region of the CD-R disk is fully occupied by data, a user cannot record the visual image on the CD-R disk any more. The user, however, usually does not store data up to the full data capacity of the CD-R disk, and most of the recording region of the CD-R disk is often left unrecorded.

The amount of data may be reduced to secure an unrecorded region in which the visual image is to be recorded. The visual image is recorded using a track making a circuit of the optical disk as a scanning line. The scanning line is near-circular, and the scanning line at the inner radius is different in length from the scanning line at the outer radius. Accordingly, if the bit data based on rectangular coordinates are used, the visual image may be deformed. However, characters recorded on the optical disk are readable enough.

FIG. 3 shows an example in which "12" is visibly recorded on the optical disk. In the case of CD-R, it is advisable to use more than 10 tracks to form a character because track pitch is 1.6 μm and a visible character formed with 10 tracks or less is too small to read by the naked eye.

The bit data of rectangular coordinates can be used as-is to form the visual image.

As described above, a user can record a visual image in a region that has been left unused, for example, by forming a series of pits in the region. There is no risk that the visual image degrades the recording quality of computer programs, document files, and music data that are previously recorded. The region in the data recording surface of the optical disk that is left unused can be utilized effectively without wasting it.

Since the recording region of the reproducible data and the recording region of the visual image are separated, the optical disk recording apparatus according to an embodiment can record the visual image after recording the reproducible data, and can record the visual image on an optical disk in which data are recorded therein by another optical disk recording apparatus.

Digital data stored in a CD can be easily duplicated. To discourage unauthorized duplication, a hologram image is sometimes printed on the label surface of the CD to indicate the authenticity of the CD.

The visual image of the present invention thus recorded on the data recording surface cannot be read as data (is not reproducible) by the optical disk recording apparatus, and has a similar effect as the hologram. A more complex image may be required to discourage unauthorized duplication more effectively.

A multiple gray scale visual image can be formed by changing the width and depth of pits forming the visual image because the reflective ratio depends on them. The width and depth of pits can be changed by changing the write power of the laser beam emitted by the optical pickup 5. Accordingly, the LD control unit 15 can provide a multiple gray scale visual image.

The image encoder 17 outputs analog or digital many-valued pit data based on the image data. The LD control unit 15 causes the optical pickup 5 to increase or decrease the amount of laser beam write power based on the many-valued pit data. The optical pickup 5 applies the laser beam to the data recording surface of the optical disk 20 and records the visual image that is formed by pits having different width and depth on the data recording surface of the optical disk 20.

In other words, when the visual image is recorded on the data recording surface, the LD control unit 15 and the image encoder 17 change the amount of the laser beam power irradiating from the optical pickup 5 in steps, and further change the width and depth of long pits in response to the change in the amount of the laser beam power irradiating so that the visual image has multiple gray scale.

Figure 4:
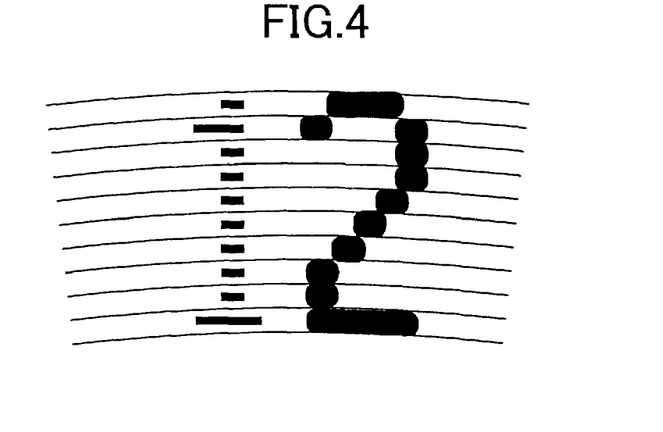
FIG. 4 is a schematic diagram showing the enlarged image of the visual image with various tones.

FIG. 4 is an enlarged schematic diagram showing a portion of the visual image having multiple gray scale.

Each pit constructing the numeral "1" is narrowed and deepened. Each pit constructing the numeral "2" is widened and made more shallow.

As described above, a many-toned complex visual image is recorded and helps a user to discriminate between a duplicate and an original.

If the laser beam is controlled to change the width and depth of the pits in the manner as described above, the optical disk recording apparatus requires an additional circuit, which incurs additional cost.

The track pitch of a CD-R disk is 1.6 μm, which means that the horizontal resolution of a pixel is very high. Since a pixel is constructed by 62 scanning lines and a pixel resolution of 100 μm is small enough, the tone of the pixel may be changed by changing the number of lines and the disposition of long pits and long spaces on the lines even without providing the additional circuit to the optical disk recording apparatus.

In other words, when recording the visual image, a pixel of the image data is formed by a plurality of tracks, and the many-tones of the pixel are represented by the number and the disposition of long pits and long spaces on the pit tracks. The many-tones are thus realized by a binary recording method.

The LD control unit 15 and the image encoder 17 form a pixel of the image data with a plurality of tracks, and represent the many-tones of the pixel with the number and the disposition of the pit tracks to realize the many-toned visual image by the binary recording method.

The many-toned pit data and the many-stepped control of write power require a complex circuit. On the other hand, the track pitch of a CD-R disk is 1.6 μm, and its resolution is high enough so that tens of tracks can be used to form a pixel, and the tone of the pixel can be realized by changing the density of pits as described above. The optical disk recording medium can record a many-toned complex visual image without using an additional circuit.

Figure 5:
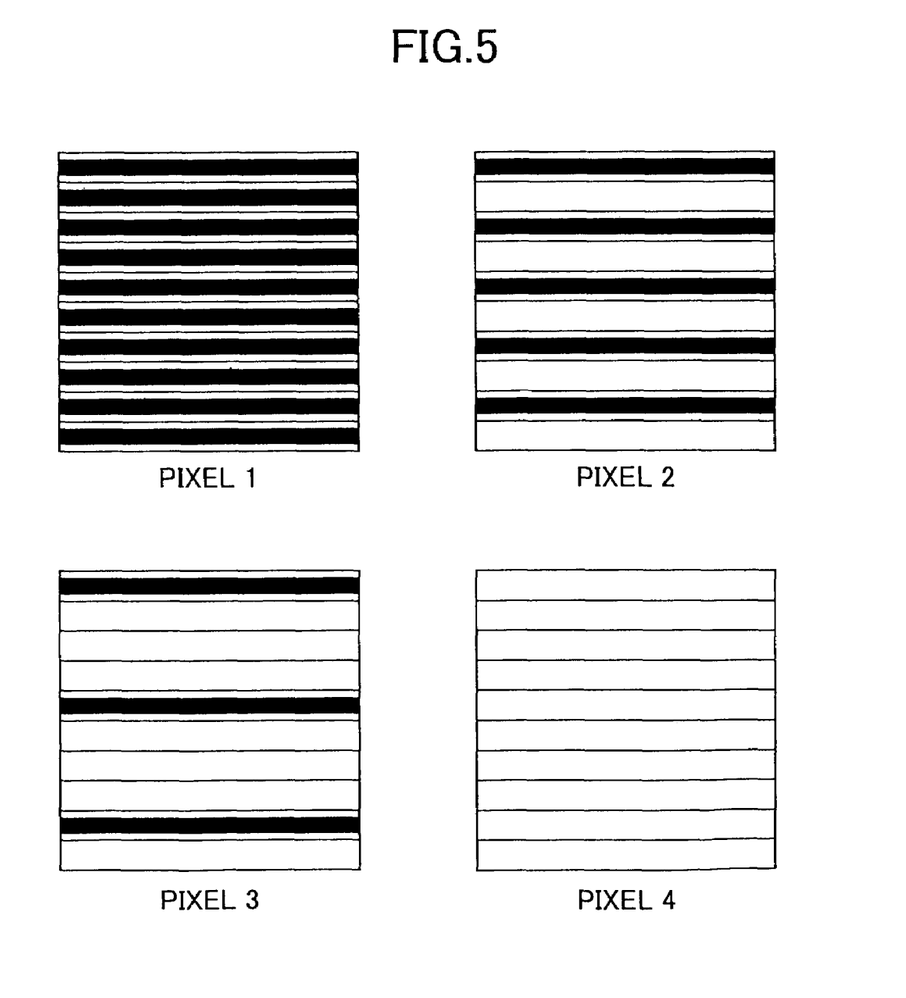
FIG. 5 is a schematic diagram showing pixels 1 through 4 representing 4 steps of tone, each constructed by 10 tracks, according to an embodiment of the present invention.

FIG. 5 is a schematic diagram showing four pixels constructed by 10 tracks having four stepped tones.

The optical disk recording apparatus is required not to overwrite the visual image on the recorded data (reproducible data).

The optical disk recording apparatus can determine up to which address data are already recorded by checking TOC and PMA of the data recording surface of the optical disk 20. The optical disk recording apparatus can check whether the visual image region designated by the host computer overlaps the recorded data region to avoid overwriting.

In the case of write once optical disks, the host computer may overwrite data on the visual image recorded in the region where no reproducible data are already recorded. In this case, the data cannot be read afterwards.

A user can determine whether to enable or disable additional writing to a CD-R disk when the user closes a session using the CD-R disk. It is beneficial that a visual image be recorded only in a disabled CD-R disk using such function.

Furthermore, the information about tracks in which the data are stored is written in the PMA (Program Memory Area). The information of the region where the visual image is recorded can be stored in PMA as "tracks" too. PMA can be used to protect the data by avoiding the overwriting of visual images.

Figure 6:
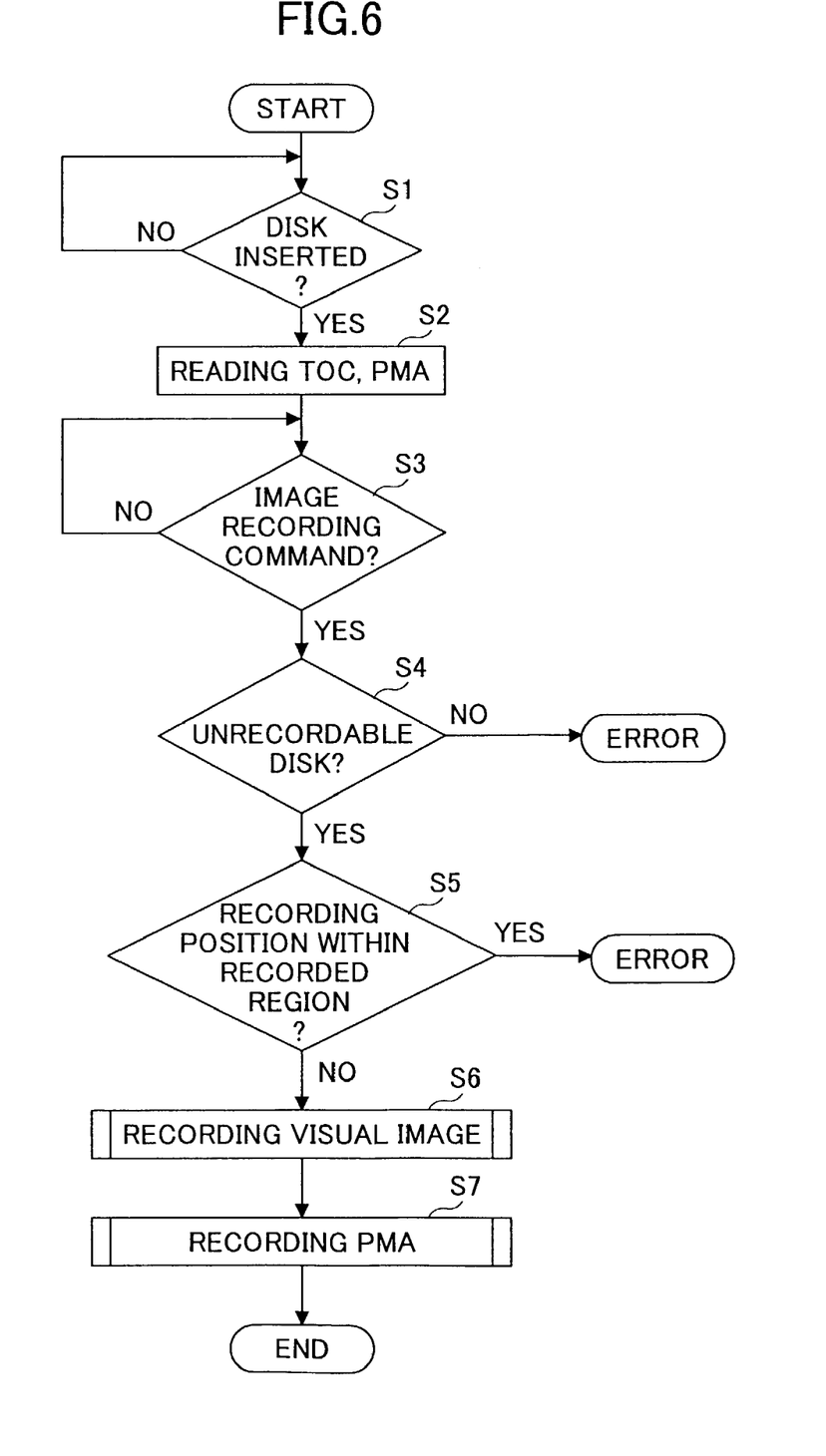
FIG. 6 is a flow chart showing an operation of an optical disk recording apparatus according to an embodiment of the present invention.

FIG. 6 is a flow chart showing an operation in which a visual image is recorded according to an embodiment of the present invention.

The system controller 16 determines whether an optical disk such as a CD-R disk is set in the optical disk recording apparatus in step S1 ("S" in the figures means a step). If an optical disk has been set, the system controller 16 reads the TOC (Table of Contents) and PMA (Program Memory Area) from the data recording surface of the optical disk in step S2.

The system controller 16 determines whether it receives a command to record a visual image from the host computer in step S3. If a command to record a visual image is received, the system controller 16 further determines whether the optical disk set in the optical disk recording apparatus is still enabled to record additional reproducible data by referring to the information of the TOC in step S4.

If the optical disk is enabled, the system controller 16 issues an error message and terminates this operation.

If the optical disk is disabled to record additional reproducible data, the system controller 16 determines in step S5, based on the information of the TOC and PMA, whether an initial position designated by the host computer at which the visual image is to be recorded is within a recorded region where data are already recorded.

If the initial position is within the recorded region, the system controller 16 issues an error message and terminates this operation. If the initial position is out of the recorded region, the system controller records the visual image on the data recording surface of the optical disk in step S6.

After recording the visual image, the system controller 16 calculates the first position and the last position between which the visual image is recorded, and stores the position information in the PMA of the optical disk as a track following existing data tracks in step S7. The last position is calculated based on the number of tracks that contain recordings. The system controller 16 may read ATIP (Absolute Time in Pre-groove) immediately after the recording of the visual image is completed.

In other words, the system controller 16 determines whether the position designated by the host computer is in the recorded region where data are already recorded based on the information stored in the TOC, PMA, or RMA of the optical disk 20 and, if the designated position is beyond the recorded region, records the visual image in an unrecorded region where no data are already recorded.

The system controller 16 determines whether a region in the data recording surface is not already recorded based on the information of the TOC, PMA, or RMA of the optical disk 20, and records the visual image in the not-recorded region.

The system controller 16 and so forth further record information indicating the region where the visual image is recorded in PMA or RMA of the data recording surface.

Accordingly, the system controller 16 can protect the data recorded in the recorded region by avoiding the data being overwritten by the visual image. The system controller 16 can prevent data from being overwritten by the visual image. If necessary, the system controller 16 can additionally record another visual image on the data recording surface of the optical disk.

By the way, the operation to encode the image data provided from the host computer depends on its data format. In the simplest case, pixel data having the same recording resolution as the optical disk 20 are provided. In this case, the encoding is completed by simply outputting the pixel data serially. Simple firmware can handle this encoding.

However, since the track density of the optical disk 20 is high, the amount of the image data is substantially large. It takes time to output the image data bit by bit to an I/O port using firmware.

However, most of embedded CPUs fortunately include a serial data output circuit. No additional hardware is needed for the encoding.

If the data output from the serial data output circuit are not in synchronization with the spindle motor, the visual image cannot be formed.

Accordingly, the optical disk recording apparatus according to an embodiment may be designed so that a clock output from a serial data output circuit of clock synchronization type is in phase synchronization with the FG pulse of the spindle motor 1.

Figure 7:
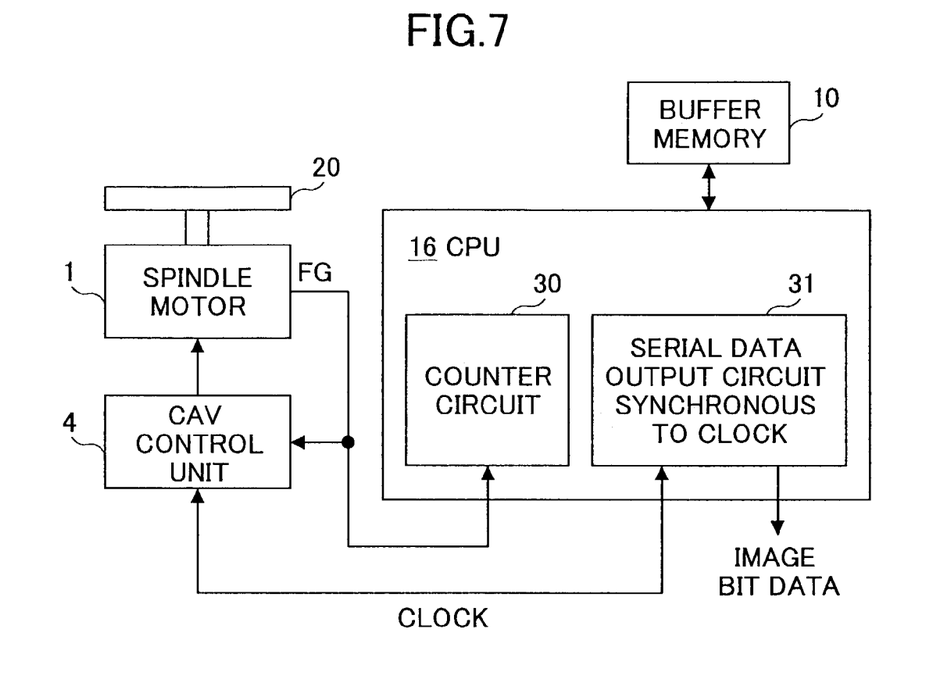
FIG. 7 is a block diagram showing a circuit construction of an optical disk recording apparatus according to another embodiment of the present invention.

FIG. 7 is a block diagram showing the construction of a circuit according to this embodiment of the present invention.

Basically, a visual image can be recorded on the data recording surface of the optical disk 20 by forming pits corresponding to the image data. If the host computer provides the image data having a pixel resolution as high as the track pitch, the system controller 16 does not need to perform any complex operation other than synchronization. Even the CPU used in the optical disk recording apparatus can handle such synchronization. However, it takes too much time to manipulate the I/O port using firmware. Accordingly, the clock synchronization type serial data output circuit 31 embedded in the CPU 16 for embedded use is used.

The FG signal of the spindle motor 1 is input to a counter circuit 30 of the CPU 16, and informs the counter circuit 30 when the spindle motor 1 passes a predetermined angular position. In response to the FG signal, the CPU 16 fetches the image data stored in the buffer memory 10 and sets the image data to the clock synchronization type serial data output circuit 31.

The clock synchronization type serial data output circuit 31 outputs the pit data and, at the same time, a data clock. The CAV control unit 4 rotates the spindle motor 1 at a constant angular velocity using the output data clock as a rotative reference signal.

As described above, the optical disk recording apparatus does not need a special image encoder that increases its cost.

The clock synchronization type serial data output circuit 31 can easily synchronize the image data and the rotation of the spindle motor 1.

If the FG pulse of the spindle motor 1 is provided to the clock synchronization type serial data output circuit 31 as a clock, the clock synchronization type serial data output circuit 31 can output the image data in synchronization with the rotation of the spindle motor 1.

The spindle motor 1 used in the optical disk recording apparatus outputs only a few FG pulses, several to tens, during a turn, which are not sufficient in view of the image resolution.

A PLL clock in phase synchronization with the FG pulse may be used to solve this problem. The number of clocks of this PLL clock corresponds to the image resolution. A clock synchronization type serial data output circuit 31 operated by the PLL clock as a clock can easily form the visual image.

Figure 8:
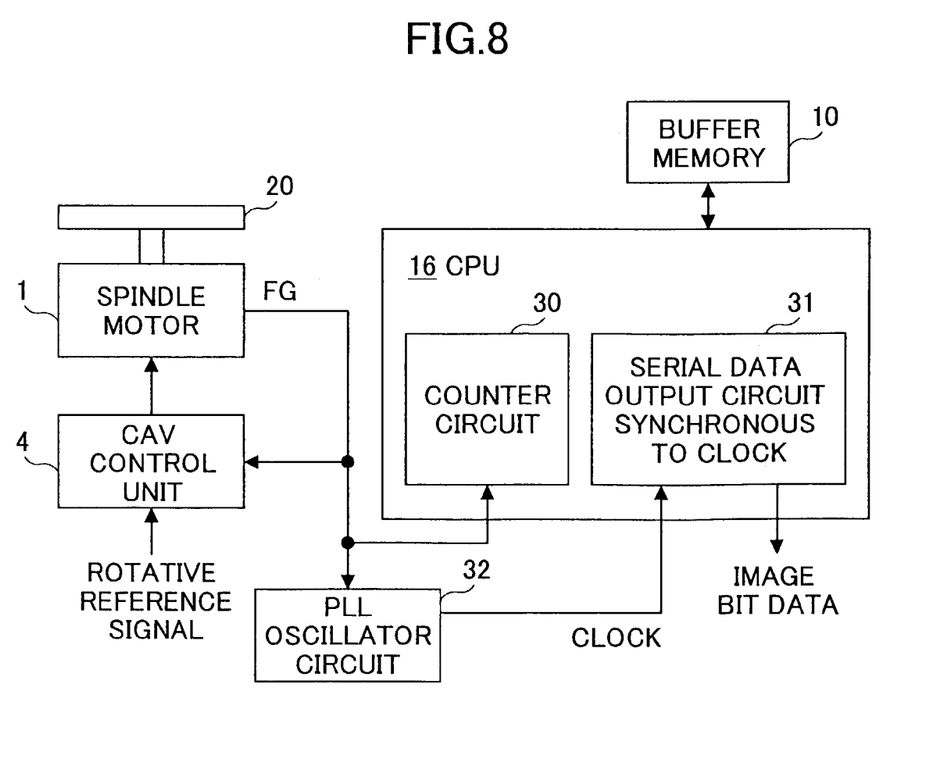
FIG. 8 is a block diagram showing a circuit construction of an optical disk recording apparatus according to yet another embodiment of the present invention.

FIG. 8 is a block diagram showing the construction of a circuit according to another embodiment of the present invention.

The spindle motor 1 is controlled to rotate at a constant angular-velocity to an appropriate reference signal instead of the output data clock. The FG signal of the spindle motor 1 is input to the counter circuit 30 and is used for line synchronization as it is in FIG. 7. FIG. 8 is different in that the FG signal is input to the PLL oscillation circuit 32.

In other words, the PLL oscillation circuit 32 outputs a clock based on the FG pulse of the spindle motor 1 rotating the optical disk 20. The CPU 16 outputs serial data in synchronization with the clock output by the PLL oscillation circuit 32 to record the visual image.

The PLL oscillation circuit 32 generates the clock in synchronization with the rotation of the spindle motor 1. The clock is input to the clock synchronization type serial data output circuit 31 as a data clock. The optical disk recording apparatus can record the visual image on the data recording surface of the optical disk in the same manner as described by reference to FIG. 7.

Accordingly, the image data and the rotation of the spindle motor are synchronized easily.

As described above, the optical disk recording apparatus according to an embodiment of the present invention can record a clear visual image on the data recording surface without degrading the data stored in the optical disk.

The preferred embodiments of the present invention are described above. The present invention is not limited to these embodiments, but various variations and modifications may be made without departing from the scope of the present invention.

This patent application is based on Japanese patent application No. 2001-167365 filed on Jun. 1, 2001, the entire contents of which are hereby incorporated by reference.

What is claimed is:

1. An optical disk recording apparatus, comprising:
    an optical pickup configured to form pits and spaces representing data to be stored in an optical disk by applying a laser beam on a data recording side of the optical disk;
    an image encoder unit configured to generate image encode data corresponding to pits and spaces longer than the pits and the spaces representing the data to be stored in the optical disk based on image data of a visible image;
    an LD control unit configured to cause said optical pickup to apply said laser beam based on said image encode data generated by said image encoder unit; and
    a system controller configured to form the pits and spaces longer than the pits and spaces representing the data to be stored in the optical disk, the longer pits and longer spaces being formed in an area where none of the data to be stored in the optical disk has been stored, thereby forming the visible image using the difference in reflection coefficient between the longer pits and the longer spaces.

2. The optical disk recording apparatus as claimed in claim 1, wherein said system controller, when recording said visual image, adjusts an amplification ratio of a servo error signal of said optical pickup in response to a change in the amount of power of said laser beam so that said optical pickup is steadily controlled by a servo mechanism.

3. The optical disk recording apparatus as claimed in claim 1, further comprising a CAV control unit that controls the rotation of said optical disk at a constant angular velocity so that a track making a circuit of said optical disk corresponds to a horizontal scanning line of rectangular coordinates.

4. The optical disk recording apparatus as claimed in claim 1, wherein
    said image encode data generated by said image encoder are many-valued; and
    said laser beam controlled by said LD control unit is changed based on said image encode data in many steps so that the width and the depth of said long pits are changed to record a many-toned visual image.

5. The optical disk recording apparatus as claimed in claim 1, wherein
    said image encode data generated by said image encoder are many-valued; and
    a pixel corresponding to an item of the many-valued image encode data is formed by a plurality of tracks, and the value of the item of the many-valued image encode data is represented by said long pits and long spaces disposed on a selected number of the tracks.

6. The optical disk recording apparatus as claimed in claim 1, wherein said system controller determines whether data are recorded in the recording region based on information stored in TOG, PMA, or RMA of said optical disk.

7. The optical disk recording apparatus as claimed in claim 1, wherein said system controller determines whether said optical disk is recordable, and if said optical disk is not recordable, said system controller further determines whether data are recorded in the recording region based on information stored in TOC, PMA, or RMA of said optical disk.

8. The optical disk recording apparatus as claimed in claim 1, wherein said system controller stores information indicating said recording region in which said visual image is recorded in PMA or RMA of said optical disk.

9. The optical disk recording apparatus as claimed in claim 1, wherein
    said system controller has a clock synchronization type serial data output circuit; and
    said image encode data are generated by firmware stored in said system controller.

10. The optical disk recording apparatus as claimed in claim 9, wherein said optical disk is rotated in synchronization with a clock output from said clock synchronization type serial data output circuit.

11. The optical disk recording apparatus as claimed in claim 9, further comprising a PLL oscillator circuit that outputs a clock based on an FG pulse of a spindle motor rotating said optical disk;
    wherein
    said visual image is recorded based on serial data output from said clock synchronization type serial data output circuit in synchronization with said clock output from said PLL oscillator circuit.

12. The optical disk recording apparatus as claimed in claim 1, wherein said system controller determines whether an area to which said longer pits and longer spaces are to be stored is currently storing pits and spaces representing data.

13. The optical disk recording apparatus as claimed in claim 1, wherein the longer pits and longer spaces are formed at a different time than when the pits and spaces representing stored data are formed.

* * * * *